June 10, 1941.  J. D. NIXON  2,245,009
FLOW VALVE
Filed Feb. 6, 1941  2 Sheets-Sheet 2

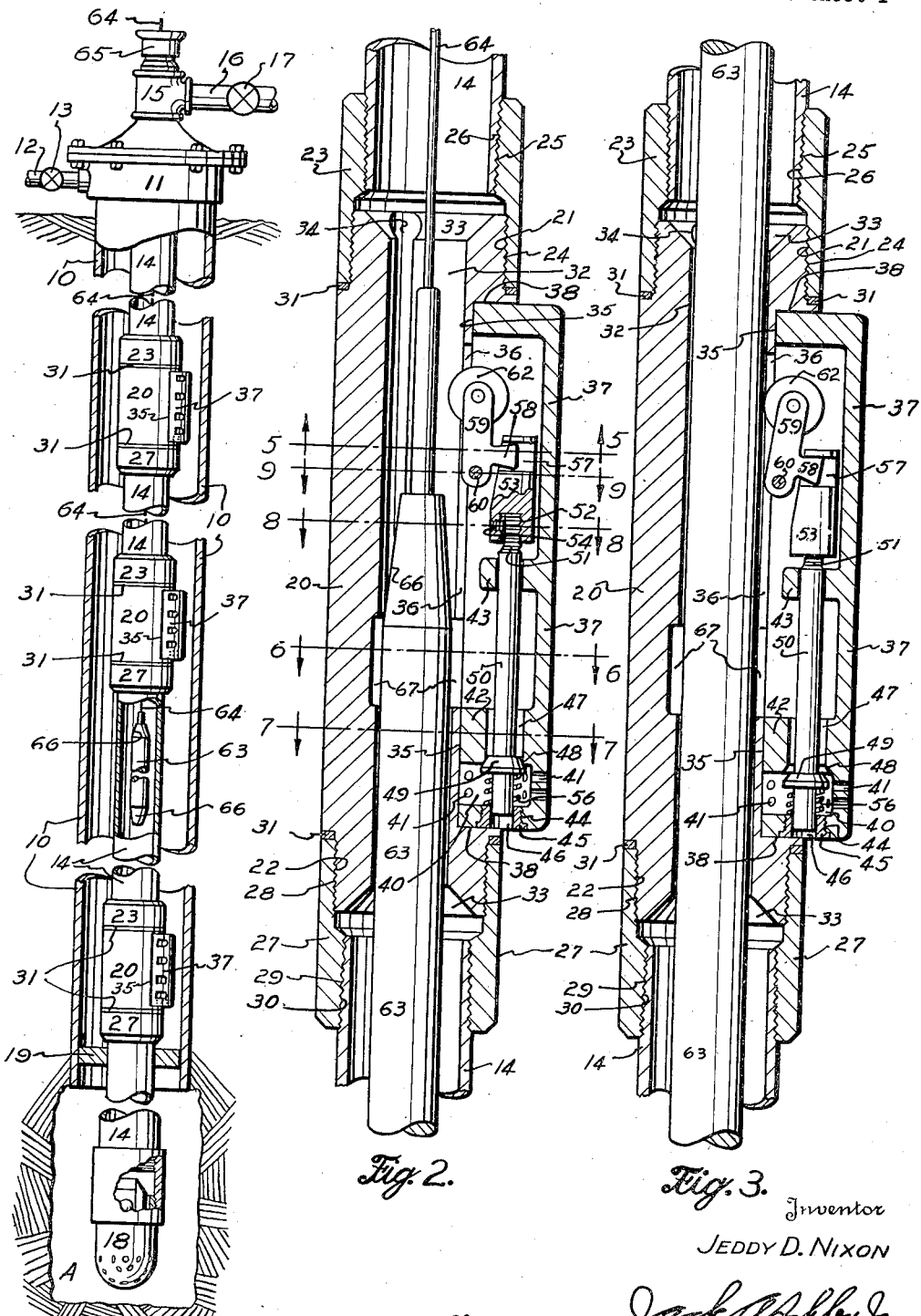

Inventor
JEDDY D. NIXON
By Jack Ashley Jr.
Attorney

Patented June 10, 1941

2,245,009

UNITED STATES PATENT OFFICE 2,245,009

FLOW VALVE

Jeddy D. Nixon, Houston, Tex., assignor of one-half to Wilson Supply Company, Houston, Tex., a corporation of Texas Application February 6, 1941, Serial No. 377,603

24 Claims. (Cl. 103—233)

This invention relates to new and useful improvements in flow valves.

This application is filed as an improvement on my Patent No. 2,171,480 and as a continuation in part of my co-pending application, Serial No. 365,024, filed November 9, 1940.

One object of the invention is to provide an improved flow valve to be used with a fluid lift, such as is set out in my Patents No. Re. 21,199; No. 2,164,469; No. 2,171,812; No. 2,202,462; and No. 2,204,817, or in place of the flow valve shown in my above-mentioned patent and co-pending application.

An important object of the invention is to provide an improved flow valve in which the fluid admitting port and valve member therefor is not exposed to the flow stream through the pipe in which the valve is mounted, whereby the port and valve member will not be cut or damaged by the flow stream.

Another object of the invention is to provide an improved flow valve that serves the same purposes and functions as the flow valve in my above-mentioned patent and co-pending application, and is an improvement thereon in action, structure and operation.

A further object of the invention is to provide an improved flow valve in which the opening of the port may be made larger or smaller without materially changing the size of any of the parts, whereby a larger or smaller flow passage may be obtained to pass a greater or smaller quantity of fluid.

A still further object of the invention is to provide an improved flow valve which is so constructed that the distance the valve member moves from said port in its open position may be regulated to control the amount of fluid admitted through said port, whereby an adjustment for said port is had.

Another object of the invention is to provide an improved flow valve so arranged that a weight bar suspended on a wire line will open the same and when said weight bar is moved out of said valve, the valve member will close without depending upon the flow or velocity of pressure fluid through said port, although this flow will assist in the closing and holding closed of said valve member.

Still another object of the invention is to provide an improved flow valve adapted to be used with a fluid lift and either one valve or as many as are needed may be used therewith, as well as any valve or valves may be opened and closed when and as desired to permit the introduction of a pressure fluid at any predetermined point or points in the well to lift the well fluid from said well.

A particular object of the invention is to provide an improved flow valve which may be used in a fluid lift in combination with other types of fluid admitting valves, such as is illustrated in my Patents No. Re. 21,199; No. 2,204,817; or my co-pending applications, Serial No. 304,684, filed November 16, 1939; Serial No. 322,065, filed March 4, 1940; Serial No. 365,024, filed November 9, 1940; and Serial No. 372,238, filed December 30, 1940.

Still another object of the invention is to provide an improved flow valve in which the actuating member of the valve member is a roller, so that no undue amount of friction will be had between said actuating member and said weight bar.

A further object of the invention is to provide an improved flow valve that is easily operated, which operation is controlled from the surface, and a valve that may be used in any type of a well at any desired depth.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a diagrammatic view, partly in elevation and partly in section, showing a series of valves mounted in a well constructed in accordance with the invention;

Figure 2 is a longitudinal, sectional view of a valve in its closed position, showing a weight bar therein ready to open said valve;

Figure 3 is a similar view, showing the weight bar holding said valve open;

Figure 4:
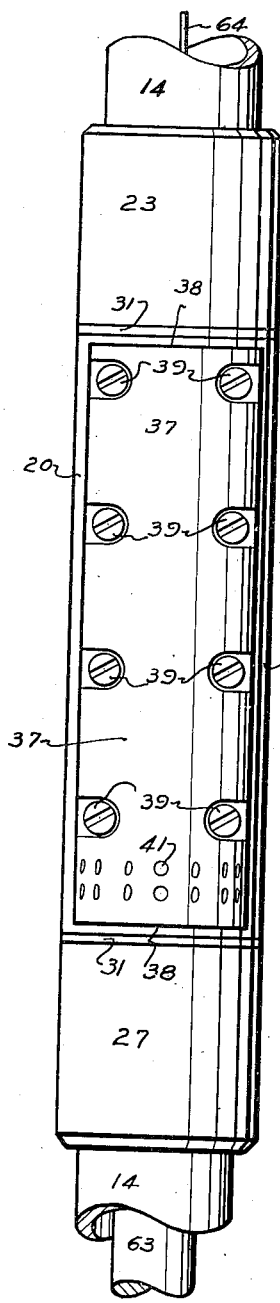
Figure 4 is an elevation of the valve, taken at right angles to Figure 2.

In the drawings, the numeral 10 designates the usual well casing which may be placed in the well bore in any suitable manner and in accordance with the conditions present at the particular installation. A suitable casing head 11 is mounted on the upper end of the casing string 10, in accordance with the practice now in common use, and this head 11 is provided with a pressure fluid inlet pipe 12, in which a manually operated, cut-off valve 13 is preferably connected. A single string of well tubing 14 is suspended or hung in the casing head 11 in any suitable manner and extends above said casing 10 and said casing head, so that a T 15 may be connected thereon. A well fluid discharge pipe 16 leads from the T and a manually operated, cut-off valve 17 may be connected therein, if desired.

In Figure 1, I have shown the tubing string 14 extending below the casing into the shot hole A and having a perforated strainer or bull plug 18 screwed onto its lower end, but it is to be understood that the tubing may be terminated at any desired point and its relation to the lower end of the casing may be varied to suit the different well conditions encountered. It is customary to sometimes perforate casing to admit the well fluid from the formation closed off by said casing and also, to use liners and elongated screens. Any of these devices may be employed in connection with the invention, as well as a suitable packer or seal-off device 19, if desired or necessary for a particular installation.

In the tubing string 14 (Figure 1), one or more elongated flow valve bodies or nipples 20 may be mounted at any desired elevation. The number and spacing of the valves used depends on the conditions and circumstances surrounding each well, as well as the use or requirement of any other flow equipment. It is customary to connect these valves in said tubing 14 at different elevations, using the uppermost valve as a kick-off valve; however, it is within the scope of the invention to use a single valve as both a kick-off valve and a flow or lifting fluid inlet valve.

The elongated, cylindrical valve body 20 is provided on its upper end with a co-axial, reduced, externally screw-threaded pin 21 and with a similar pin 22 depending from its lower end. A cylindrical collar 23 is formed with an internally screw-threaded box 24 on its lower end for engaging and receiving the threaded pin 21 and a similar box 25 on its upper end for receiving the externally screw-threaded pin 26 of said tubing 14. A similar collar 27 having an internally screw-threaded box 28 on its upper end engages the threaded pin 22 on the lower end of said valve body 20. This collar 27 also has an internally screw-threaded box 29 on its lower end for receiving the externally screw-threaded pin 30 on the upper end of a section of tubing 14. It will be seen in Figures 1, 2, 3 and 4, that by means of the collars 23 and 27 said flow valves 20 may be connected into said tubing string 14 wherever desired, either in place of the usual connecting collars of said tubing string, or if desired, any of the tubing joints or sections may be cut and threaded for receiving the boxes 25 and 29 of the collars 23 and 27 respectively. A suitable sealing ring 31 is placed on each pin 21 and 22 for receiving the abutting edge of the collars 23 and 27. These rings are preferably of a soft metal, such as brass, but any material suitable for the purpose may be used.

Figure 5:
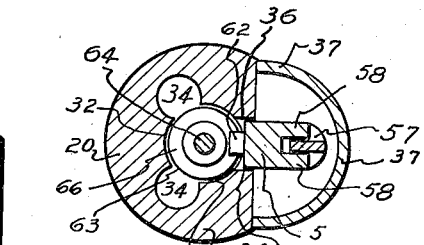
Figure 5 is a horizontal, cross-sectional view taken on the line 5—5 of Figure 2.
Figure 6:
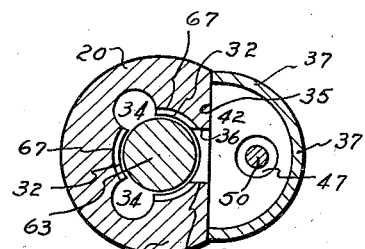
Figure 6 is a similar view taken on the line 6—6 of Figure 2.
Figure 7:
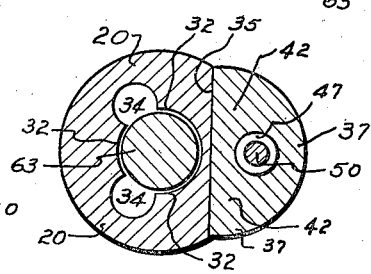
Figure 7 is a horizontal, cross-sectional view taken on the line 7—7 of Figure 2.

The body 20 has an axial bore 32 extending therethrough, which is smaller in diameter than the bore of the tubing string, and the pins 21 and 22 are beveled at 33 at each end of the bore 32, so as to guide tools and other appliances into said bore. In order to provide ample flow space through said valve bodies, a pair of elongated ducts 34 are provided longitudinally of the body on each side of the bore 32 thereof, as is best shown in Figures 5, 6 and 7. One side of the body is cut out to form a vertical, external recess 35 and a portion of this recess is connected to said bore 32 by an elongated channel 36, as is shown in Figures 2, 3, 5 and 6. It will also be noted that the ducts 34 and the channel 36 are placed substantially equidistantly around said bore 32, although the exact location thereof is not material to the proper operation of said valve with the exception of the channel 36.

An upright valve casing or housing 37 is mounted in this recess 35, so as to engage snugly between the shoulders 38 formed at the lower and upper ends of said recess. This valve casing may be secured in the recess in any suitable manner, so that it may be removed, if necessary. It is common practice to bolt such structures, and the valve casing may be bolted to the valve body 20 and these bolts 39 are removed when it is desired to remove said casing 37. This casing has an inlet chamber 40 at its lower end provided with radial perforations 41, whereby the well fluid and/or lifting fluid from the well casing may freely enter said chamber. The top of the chamber is formed by a transverse partition 42 above which overhangs an ear 43, formed integral with the valve casing 37.

The casing 37, as shown in Figures 5, 6 and 7, may be given a nearly semi-circular shape. The lower end of said casing is closed and provided with a screw-threaded and counterbored opening 44 for receiving a plug 45 having an axial bore 46 extending therethrough. The partition 42 is provided with a vertical port 47 extending therethrough, and the lower end thereof is suitably beveled to form a ground valve seat 48 to co-act with a valve head or member 49 mounted on the lower portion of a valve stem 50. The lower end of said valve stem telescopes within the bore 46 of said plug 45 and extends up through the port 47 and the ear 43, which forms a guide therefor. The upper end of said valve stem is externally screw-threaded to form a pin 51, which telescopes into a socket 52 of a cap or head 53.

Figure 8:
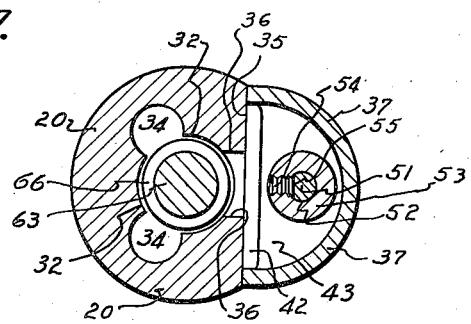
Figure 8 is a similar view taken on the line 8—8 of Figure 2.
Figure 9:
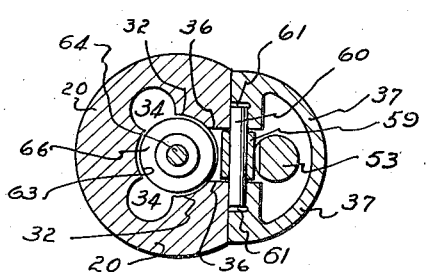
Figure 9 is a horizontal, cross-sectional view taken on the line 9—9 of Figure 2.

The lower end of this cap 53 is provided with a set screw 54 (Figures 2 and 8), which engages in a key groove 55 in the pin 51 of the valve stem 50, whereby said cap is held on said stem against rotation. A coiled spring 56 is confined between the lower edge of the valve head 49 and the upper side of the plug 45, so as to force said valve head and stem 50 upwardly at all times and to hold said valve head 49 against said seat 48.

The upper end of the cap 53 is provided with diametrically opposite slots or recesses 57, which receive the yoke 58 of a bell crank lever 59, as is best shown in Figures 2, 3 and 5. The lower end of the lever 59 is pivoted on a pin 60 journaled in slots 61 formed in the wall of the casing 37. The upper end of the lever 59 has a small roller 62 journaled therein. When the bore 32 of the valve body 20 is unobstructed, as in Figures 2 and 5, the roller 62 on the lever 59 is free to swing through the channel 36 into said bore and this will be its position when the valve is closed; the spring 56 being under sufficient compression to raise the valve stem 50, the cap 53 and swing the lever 59 outwardly. It will also be noticed from these figures that the roller 62 extends through the channel 36 out into the bore 32, where it will be engaged by an actuating member or weight bar 63 when the same is in the bore 32, as shown in Figure 3.

This weight bar 63 is suspended on a wire line or a flexible connection 64, which extends up through the tubing string 14 and out of a suitable stuffing box 65 on the upper end of said tubing string. This weight bar is beveled at 66 on each end, so as to facilitate its passage up and down through the tubing and its entrance into the bore 32 of the valve bodies 20, or any other devices mounted in said tubing string. The weight bar 63 has a snug, sliding fit in the bore 32 of the valve body 20 and when the bar is lowered into or raised up into said bore, one of the beveled surfaces 66 will engage the roller 62 and ride thereupon, until said roller is riding upon the surface of the bar 63, as is shown in Figure 3. When this occurs, of course the lever 59 is swung outwardly and the yoke 58 downwardly, which depresses the cap 53, the valve stem 50 and the valve head 49 to open the port 47, so that fluid within the casing string 10 outside of the tubing string 14 may enter the perforations 41 of said inlet chamber 40 and flow through the port 47, into the valve casing 37, through the channel 36 and into the bore 32, where it will lift the column of fluid standing therein and in the tubing thereabove.

Attention is called to Figures 2 and 3, in which it will be seen that an annular recess or chamber 67 is cut in the wall of the bore 32 and that the lower edge of this recess is substantially even or on a line with the lower edge of the channel 36 and the upper surface of the partition 42. This recess 67 is provided so that fluid flowing through the port 47 may readily flow around the weight bar 63 and into the ducts 34, whereby an even distribution of lifting fluid around said weight bar is obtained. Any suitable means (not shown) on the surface of the well may be employed to raise and lower said weight bar 63.

When this weight bar is lowered to approximately its position shown in Figure 2, or raised up out of the bore 32, the roller 62 will ride on one of the beveled surfaces 66 and the lever 59 will swing inwardly, until said roller protrudes through the channel 36 into said bore 32. Of course, the spring 56, being under tension, will lift said valve head 49, the valve stem 50, the cap 53 and force said lever 59 and roller 62 against the surface of the weight bar and the beveled end 66, so that when said roller is not contacting said weight bar, the valve head 49 will engage its seat 48 (Figure 2) and when said roller is engaging said bar, said valve is in its open position (Figure 3). Thus, it will be seen that a surface controlled and operated valve is obtained, which may be opened or closed when and as desired.

Various changes, alterations and modifications may be made in the size, shape and arrangement of the herein described elements, within the scope of the appended claims.

What I claim and desire to secure by Letters Patent is:

1. As a new article of manufacture, an inlet valve for a well fluid lifting system which includes, a body having a bore, a casing having a fluid inlet and a fluid outlet removably mounted on the outer surface of said body, a valve seat in the casing between said inlet and outlet, said outlet communicating with the bore of said body, a valve member engaging said seat, said valve member normally seating against flow from said casing into said tubing, a valve operating element mounted on the casing and projecting therefrom into said body, and means for maintaining the valve member in its closed or seat engaging position except when the valve operating element is actuated to disengage said valve member from said seat.

2. As a new article of manufacture, an inlet valve for a well fluid lifting system which includes, a body having a bore, a casing having a fluid inlet and a fluid outlet removably mounted on the outer surface of said body, a valve seat in the casing between said inlet and outlet, said outlet communicating with the bore of said body, a valve member engaging said seat, said valve member normally seating against flow from said casing into said tubing, a valve operating element mounted on the casing, and means for maintaining the valve member in its closed or seat engaging position except when the valve operating element is actuated to disengage said valve member from said seat, said valve operating element having a portion projecting into the bore of said body, whereby the projecting portion of said operating element is actuated from said bore of said body.

3. In a well flowing apparatus in a well casing and a well tubing mounted therein, the combination of, a body adapted to be connected in the tubing having an axial bore, a valve casing communicating with the bore of the body and removably mounted on the outside of said body, a valve in the casing, said valve normally seating against flow from said casing into said tubing, an operating member connected with said valve and having a portion exposed in the bore of the body, and a tool movable in the bore of the body to displace the operating member to open the valve, and means for closing the valve when the tool is moved from engagement with the operating member.

4. In a well flowing apparatus in a well casing and a well tubing mounted therein, the combination of, a body adapted to be connected in the tubing having an axial bore therethrough, a valve casing communicating with the bore of the body and removably mounted on the outside of said body, a valve in the casing out of the path of the flow of fluid through the bore of the body, said valve normally seating against flow from said casing into said tubing, an operating member connected with said valve and having a portion exposed in the bore of the body, a tool movable in the bore of the body to displace the operating member to open the valve, and means for closing the valve when the tool is moved in the bore of the body from engagement with the operating member.

5. A flow valve for a well having the usual casing and tubing string mounted therein including, an elongate body adapted to be connected in the well tubing and formed with a bore extending therethrough, an inlet in the body providing communication between the outside of the tubing and the bore of said body for admitting fluid into said body, a valve casing removably mounted on the outside of said body and communicating with the inlet of said body having a port and passageway therethrough, a valve member for said port for opening and closing the same to control the flow of fluid through said port and into said bore, said valve member normally seating against flow from said casing into said tubing, an operating member connected to the valve member for actuating said valve member, and surface controlled actuating means movable in said body for engaging said operating member to move said valve member to open said port and to release said operating member to permit said valve member to close said port.

6. A flow valve for a well having the usual casing and tubing string mounted therein including, an elongate body adapted to be connected in the well tubing and formed with a bore extending therethrough, an inlet in the body providing communication between the outside of the tubing and the bore of said body for admitting fluid into said body, a valve casing removably mounted on the outside of said body and communicating with the inlet of said body having a port and passageway therethrough, a valve member for said port for opening and closing the same to control the flow of fluid through said port and into said bore, said valve member normally seating against flow from said casing into said tubing, an operating member adjustably connected to the valve member for actuating said valve member, and surface controlled actuating means movable in said body for engaging said operating member to move said valve member to open said port and to release said operating member to permit said valve member to close said port.

7. A flow valve for a well having the usual casing and tubing string mounted therein including, an elongate body adapted to be connected in the well tubing and formed with a bore extending therethrough, an inlet in the body providing communication between the outside of the tubing and the bore of said body for admitting fluid into said body, a valve casing removably mounted on the outside of said body and communicating with the inlet of said body having a port and passageway therethrough, a valve member for said port for opening and closing the same to control the flow of fluid through said port and into said bore, said valve member normally seating against flow from said casing into said tubing, an operating member connected to the valve member for actuating said valve member, surface controlled actuating means movable in said body for engaging said operating member to move said valve member to open said port and to release said operating member to permit said valve member to close said port, and a guide within the bore of said body for guiding said actuating means into said body.

8. A flow valve for a well having the usual casing and tubing string mounted therein including, an elongate body adapted to be connected in the well tubing and formed with a bore extending therethrough, an inlet in the body providing communication between the outside of the tubing and the bore of said body for admitting fluid into said body, a valve casing removably mounted on the outside of said body and communicating with the inlet of said body having a port and passageway therethrough, a valve member for said port for opening and closing the same to control the flow of fluid through said port and into said bore, said valve member normally seating against flow from said casing into said tubing, an operating member connected to the valve member for actuating said valve member, surface controlled actuating means movable in said body for engaging said operating member to move said valve member to open said port and to release said operating member to permit said valve member to close said port, and flow passages formed in the bore of said body to facilitate the flow of fluid through said bore when the actuating means is positioned therein.

9. A flow valve for a well having the usual casing and tubing string mounted therein including, an elongate body adapted to be connected in the well tubing and formed with a bore extending therethrough, an inlet in the body providing communication between the outside of the tubing and the bore of said body for admitting fluid into said body, a valve casing removably mounted on the outside of said body and communicating with the inlet of said body having a port and passageway therethrough, a valve member for said port for opening and closing the same to control the flow of fluid through said port and into said bore, said valve member normally seating against flow from said casing into said tubing, an operating member connected to the valve member for actuating said valve member, surface controlled actuating means movable in said body for engaging said operating member to move said valve member to open said port and to release said operating member to permit said valve member to close said port, a guide within the bore of said body for guiding said operating means into said body, and flow passages formed in the bore of said body and extending through the guide to facilitate the flow of fluid through said bore when the actuating means is positioned therein.

10. A flow valve for a well having the usual casing and tubing string mounted therein including, an elongate body adapted to be connected in the well tubing and formed with a bore extending therethrough, an inlet in the body providing communication between the outside of the tubing and the bore of said body for admitting fluid into said body, a valve casing removably mounted on the outside of said body and communicating with the inlet of said body having a port and passageway therethrough, a valve member for said port for opening and closing the same to control the flow of fluid through said port and into said bore, said valve member normally seating against flow from said casing into said tubing, an operating member adjustably connected to the valve member for actuating said valve member, surface controlled actuating means movable in said body for engaging said operating member to move said valve member to open said port and to release said operating member to permit said valve member to close said port, and guide surfaces on each end of the bore of said body for guiding said actuating means into said body.

11. A flow valve for a well having the usual casing and tubing string mounted therein including, an elongate body adapted to be connected in the well tubing and formed with a bore extending therethrough, an inlet in the body providing communication between the outside of the tubing and the bore of said body for admitting fluid into said body, a valve casing removably mounted on the outside of said body and communicating with the inlet of said body having a port and passageway therethrough, a valve member for said port for opening and closing the same to control the flow of fluid through said port and into said bore, said valve member normally seating against flow from said casing into said tubing, an operating member adjustably connected to the valve member for actuating said valve member, surface controlled actuating means movable in said body for engaging said operating member to move said valve member to open said port and to release said operating member to permit said valve member to close said port, and flow passages formed in the bore of said body to facilitate the flow of fluid through said bore when the actuating means is positioned therein.

12. A flow valve for a well having the usual casing and tubing string mounted therein including, an elongate body adapted to be connected in the well tubing and formed with a bore extending therethrough, an inlet in the body providing communication between the outside of the tubing and the bore of said body for admitting fluid into said body, a valve casing removably mounted on the outside of said body and communicating with the inlet of said body having a port and passageway therethrough, a valve member for said port for opening and closing the same to control the flow of fluid through said port and into said bore, an operating member connected to the valve member for actuating said valve member, surface controlled actuating means movable in said body for engaging said operating member to move said valve member to open said port and to release said operating member to permit said valve member to close said port, flow passages formed in the bore of said body to facilitate the flow of fluid through said bore when the actuating means is positioned therein, and a distributing recess extending from the passageway of said valve casing within said bore across the faces of the flow passages extending through said bore.

13. A flow valve for a well having the usual casing and tubing string mounted therein including, an elongate body adapted to be connected in the well tubing and formed with a bore extending therethrough, an inlet in the body providing communication between the outside of the tubing and the bore of said body for admitting fluid into said body, a valve casing removably mounted on the outside of said body and communicating with the inlet of said body having a port and passageway therethrough, a valve member for said port for opening and closing the same to control the flow of fluid through said port and into said bore, an operating member adjustably connected to the valve member for actuating said valve member, surface controlled actuating means movable in said body for engaging said operating member to move said valve member to open said port and to release said operating member to permit said valve member to close said port, guide surfaces on each end of the bore of said body for guiding said actuating means into said body, and a distributing recess extending from the passageway of said valve casing within said bore.

14. A flow valve for a well having the usual casing and tubing string mounted therein including, an elongate body adapted to be connected in the well tubing and formed with a bore extending therethrough, an inlet in the body providing communication between the outside of the tubing and the bore of said body for admitting fluid into said body, a valve casing removably mounted on the outside of said body and communicating with the inlet of said body having a port and passageway therethrough, a valve member for said port for opening and closing the same to control the flow of fluid through said port and into said bore, an operating member adjustably connected to the valve member for actuating said valve member, surface controlled actuating means movable in said body for engaging said operating member to move said valve member to open said port and to release said operating member to permit said valve member to close said port, flow passages formed in the bore of said body to facilitate the flow of fluid through said bore when the actuating means is positioned therein, and a distributing recess extending from the passageway of said valve casing within said bore across the faces of the flow passages extending through said bore.

15. A flow valve for a well having the usual casing and tubing string suspended therein including, an elongated body adapted to be connected to the well tubing and formed with a bore extending therethrough, an inlet in the body providing communication between the outside of the tubing and the bore of said body for admitting fluid into said body, a valve casing removably mounted on the outside of said body and communicating with the inlet of said body having a port and a passageway therethrough, a valve member for said port for opening and closing the same to control the flow of fluid through said port and into said bore, an operating member adjustably connected to the valve member for actuating said valve member, surface controlled actuating means movable in said body for engaging said operating member to move said valve member to open said port and to release said operating member to permit said valve member to close said port, a guide within the bore of said body for guiding said actuating means in said body, flow passages formed in the bore of said body to facilitate the flow of fluid through said bore when said actuating means is positioned therein, and a distributing recess extending from the passageway of said valve casing within said bore across the faces of the flow passages extending through said bore.

16. A flow valve for a well having the usual casing and tubing string suspended therein including, an elongated body adapted to be connected to the well tubing and formed with a bore extending therethrough, an inlet in the body providing communication between the outside of the tubing and the bore of said body for admitting fluid into said body, a valve casing removably mounted on the outside of said body and communicating with the inlet of said body having a port and a passageway therethrough, a valve member for said port for opening and closing the same to control the flow of fluid through said port and into said bore, an operating member adjustably connected to the valve member for actuating said valve member, surface controlled actuating means movable in said body for engaging said operating member to move said valve member to open said port and to release said operating member to permit said valve member to close said port, a guide within the bore of said body for guiding said actuating means in said body, flow passages formed in the bore of said body to facilitate the flow of fluid through said bore when said actuating means is positioned therein, a distributing recess extending from the passageway of said valve casing within said bore across the faces of the flow passages extending through said bore, and guide surfaces on each end of the bore of said body for guiding said actuating means into said body.

17. As a new article of manufacture, an inlet valve for a well fluid lifting system which includes, a body having a bore, a casing having a fluid inlet and a fluid outlet removably mounted on the outside of said body, said outlet communicating with the bore of said body, a valve seat in the casing between the inlet and outlet, a valve member engaging said seat, said valve member normally seating against flow from said casing into said tubing, a valve operating element mounted on the casing and projecting therefrom into the bore of said body, means for maintaining the valve member in its closed or seat engaging position except when the valve operating element is actuated to disengage said valve member from said seat, and a guide within the bore of said body.

18. As a new article of manufacture, an inlet valve for a well fluid lifting system which includes, a body having a bore, a casing having a fluid inlet and a fluid outlet removably mounted on the outside of said body, said outlet communicating with the bore of said body, a valve seat in the casing between the inlet and outlet, a valve member engaging said seat, said valve member normally seating against flow from said casing into said tubing, a valve operating element connected to the valve member for actuating the same and mounted in the casing and projecting therefrom into the bore of said body, means for maintaining the valve member in its closed or seat engaging position except when the valve operating element is actuated to disengage said valve member from said seat, and a guide within the bore of said body.

19. As a new article of manufacture, an inlet valve for a well fluid lifting system which includes, a body having a bore, a casing having a fluid inlet and a fluid outlet removably mounted on the outside of said body, said outlet communicating with the bore of said body, a valve seat in the casing between the inlet and outlet, a valve member engaging said seat, said valve member normally seating against flow from said casing into said tubing, a valve operating element mounted on the casing and projecting therefrom into the bore of said body, means for maintaining the valve member in its closed or seat engaging position except when the valve operating element is actuated to disengage said valve member from said seat, and flow passages formed in the bore of said body to facilitate the flow of fluid through said bore.

20. As a new article of manufacture, an inlet valve for a well fluid lifting system which includes, a body having a bore, a casing having a fluid inlet and a fluid outlet removably mounted on the outside of said body, said outlet communicating with the bore of said body, a valve seat in the casing between the inlet and outlet, a valve member engaging said seat, said valve member normally seating against flow from said casing into said tubing, a valve operating element mounted on the casing and projecting therefrom into the bore of said body, means for maintaining the valve member in its closed or seat engaging position except when the valve operating element is actuated to disengage said valve member from said seat, flow passages formed in the bore of said body to facilitate the flow of fluid through said bore, and a distributing recess extending from the fluid outlet of said casing within said bore across the faces of the flow passages extending through said bore.

21. As a new article of manufacture, an inlet valve for a well fluid lifting system which includes, a body having a bore, a casing having a fluid inlet and a fluid outlet removably mounted on the outside of said body, said outlet communicating with the bore of said body, a valve seat in the casing between the inlet and outlet, a valve member engaging said seat, said valve member normally seating against flow from said casing into said tubing, a valve operating element mounted on the casing and having a portion projecting therefrom into the bore of said body, means for maintaining the valve member in its closed or seat engaging position except when the valve operating element is actuated to disengage said valve member from said seat, whereby the projecting portion of said operating element is actuated from said bore of said body, and a guide within the bore of said body.

22. As a new article of manufacture, an inlet valve for a well fluid lifting system which includes, a body having a bore, a casing having a fluid inlet and a fluid outlet removably mounted on the outside of said body, said outlet communicating with the bore of said body, a valve seat in the casing between the inlet and outlet, a valve member engaging said seat, said valve member normally seating against flow from said casing into said tubing, a valve operating element connected to the valve member for actuating the same and mounted in the casing and having a portion projecting therefrom into the bore of said body, means for maintaining the valve member in its closed or seat engaging position except when the valve operating element is actuated to disengage said valve member from said seat, whereby the projecting portion of said operating element is acutated from said bore of said body, and a guide within the bore of said body.

23. As a new article of manufacture, an inlet valve for a well fluid lifting system which includes, a body having a bore, a casing having a fluid inlet and a fluid outlet removably mounted on the outside of said body, said outlet communicating with the bore of said body, a valve seat in the casing between the inlet and outlet, a valve member engaging said seat, said valve member normally seating against flow from said casing into said tubing, a valve operating element mounted on the casing and having a portion projecting therefrom into the bore of said body, means for maintaining the valve member in its closed or seat engaging position except when the valve operating element is actuated to disengage said valve member from said seat, whereby the projecting portion of said operating element is actuated from said bore of said body, and flow passages formed in the bore of said body to facilitate the flow of fluid through said bore.

24. As a new article of manufacture, an inlet valve for a well fluid lifting system which includes, a body having a bore, a casing having a fluid inlet and a fluid outlet removably mounted on the outside of said body, said outlet communicating with the bore of said body, a valve seat in the casing between the inlet and outlet, a valve member engaging said seat, said valve member normally seating against flow from said casing into said tubing, a valve operating element mounted on the casing and having a portion projecting therefrom into the bore of said body, means for maintaining the valve member in its closed or seat engaging position except when the valve operating element is actuated to disengage said valve member from said seat, whereby the projecting portion of said operating element is actuated from said bore of said body, flow passages formed in the bore of said body to facilitate the flow of fluid through said bore, and a distributing recess extending from the fluid outlet of said casing within said bore across the faces of the flow passages extending through said bore.

JEDDY D. NIXON.